INVENTORS:
JOHN O. KING, JR.
CHARLES F. MARSCHNER

BY Newton, Hopkins, & Ormsby
Attorneys

Nov. 16, 1971  J. O. KING, JR., ET AL  3,620,119
FASTENERS AND METHOD AND APPARATUS FOR FORMING FASTENERS
Filed Aug. 21, 1968  3 Sheets-Sheet 2

INVENTORS
JOHN O. KING, JR.
CHARLES T. MARSCHNER
BY Newton, Hopkins,
& Ormsby
Attorneys

United States Patent Office 3,620,119
Patented Nov. 16, 1971

3,620,119
FASTENERS AND METHOD AND APPARATUS FOR FORMING FASTENERS
John O. King, Jr., 110 Lake Forrest Lane NE., Atlanta, Ga. 30305, and Charles F. Marschner, 595 Wisteria Drive, Mairetta, Ga. 30060
Continuation-in-part of application Ser. No. 711,368, Mar. 7, 1968. This application Aug. 21, 1968, Ser. No. 754,194
Int. Cl. B21c 23/22; B28b 1/24; B29f 1/10; F16b 35/00
U.S. Cl. 85—1 C
16 Claims

ABSTRACT OF THE DISCLOSURE

A fastener and method and apparatus for protectively coating the working surfaces of same wherein the method comprises the step of extruding a thin metallic material onto the unthreaded shank portion of a fastener in intimate contact therewith to enlarge the effective diameter of the fastener while producing an anti-corrosive material between the material of the fastener proper and the work pieces which the fastener connects after the fastener is installed. The method may also include plating covering the surface of the fastener with a material which acts as a lubricant during the extrusion of the surface material about the shank portion of the fastener, or the lubrication of the dies used to extrude the material about the shank portion of the fastener prior to the extrusion operation, or lubricating the surfaces of the metallic material that is to be extruded onto the fastener prior to the extruding operation.

The apparatus of the invention includes a die defining a passage therethrough which has an extruding section with a diameter slightly larger than the diameter of the fastener onto which the material is to be extruded, a means for maintaining the fastener centered within the passage through the die, means for forcing the fastener and the material to be extruded thereon through the extruding section of the passage and means for ejecting the fastener from the passage after the extruding operation. Alternatively, the apparatus of the invention may include a die defining a passage therethrough having a diameter slightly larger than the diameter of the fastener onto which the material is to be formed. The die further includes a second passage in communication with the first passage through which the material to be coated on the fastener is introduced into the first passage and means for positioning the fastener in the first passage and centering the same while the material is forced from the second passage into the first passage and around the fastener to coat the same.

The fastener has a thin surface material formed directly onto the unthreaded shank portion and the underside of the head of the fastener. The unthreaded shank portion may have a reduced diameter from the normally standard one, and the thin coating material may enlarge this portion to the normal standard diameter.

CROSS REFERENCE TO RELATED APPLICATIONS

This application is a continuation-in-part application of U.S. application, Ser. No. 711,368, filed Mar. 7, 1968, for "Fastener Adapter and Method" of which the inventor is John O. King, Jr., now abandoned.

BACKGROUND OF THE INVENTION (1) Field of the invention

This invention relates generally to fasteners and the protective coating thereof, and more particularly to a fastener and a method of and apparatus for producing the protective coating to surround the fasteners in which the unthreaded shank portion of the fasteners are coated with a corrosion inhibitive, rigid metallic or metal base material.

(2) Discussion of the prior art

Environment conditions frequently cause corrosion to take place between fasteners and the material assembled together by the fasteners. This is due primarily to the electrical potential set up when the fastener and the work pieces which the fastener holds together are of a different material having different electrical potentials. The rate and degree of corrosion of such a fastener and the work pieces which it holds together are also functions of the stress level imposed on the work pieces either as a result of an interference fit between the fastener and the work pieces or by external forces applied to the work pieces.

Cadmium, zinc and other electroplated metals are normally used for coating prior art fasteners to inhibit corrosion between the fastener and the work pieces; however, since the coatings have different electrical and chemical potentials from the aluminum alloy work pieces with which they are normally used, corrosion still takes place between the fasteners and the work pieces. Aluminum or plastic coatings, then, are more satisfactory for these fastener applications because these materials do not readily allow corrosion to take place between the fastener and the work pieces. While these materials are superior to cadmium, zinc, and other electroplated metals they do not lend themselves readily to electrodeposition onto the fastener. Moreover, the degree of protection afforded by a coating on a fastener is directly proportional to the thickness of the coating. Since electrodeposition of metals onto a fastener is generally limited to very thin coatings, such coated fasteners have been inadequate due to the coating being quickly destroyed and allowing corrosive reactions to take place between the fastener and the work pieces.

Electrodeposition of metals onto a fastener can also create other inherent fastener problems such as embrittlement of the coating applied to the fastener. Hot dipping, as with zinc or aluminum, provides an adequately thick coating, but this coating is insufficiently uniform in thickness to insure the degree of protection necessary for the fastener in a normal operating environment. Mechanical coating, such as peen plating, is limited by the state of the art to cadmium or zinc which substantially eliminates such type coating for use in inhibiting corrosion. Further, such plated parts frequently exhibit prohibitive porosity which prevents the material peen plated on the fastener from providing sufficient corrosive inhibitive protection when utilizing the fastener in its normal environment.

It is frequently necessary to provide an oversize fastener for fastening together work pieces which have improper holes therethrough for the receipt of the fastener therein. The fastener required to correct this situation is of a size that is not readily available on the market in the standard fastener designations. Therefore, it is necessary that special oversize fasteners be provided to fasten these work pieces together. Since these oversize fasteners are manufactured in such small quantities, the cost thereof is proportionately exorbitant so as to prevent the stocking of these oversize fasteners in large numbers as may be required in many industries, especially the aircraft construction and repair industry.

SUMMARY OF THE INVENTION

These and other problems associated with prior art are overcome by the invention disclosed herein, in that the coating applied to the fastener is sufficiently thick to inhibit corrosion between the work pieces and the fastener and which is sufficiently uniform in thickness to carry a bearing load. The coating applied by the invention is sufficiently impervious and malleable to prevent contact between the shank of the fastener and the corrosive environment in which it is placed, and allows the use of the fastener in an environment in which the work pieces exert shear forces on the fastener. Further, the invention provides an oversize fastener which is not prohibitively costly so that such fasteners may be stocked for use as needed.

A first embodiment of the method of the invention includes the step of extruding a material around the shank of a fastener wherein the extruded material has a uniform thickness both along the length of the shank of the fastener and circumferentially about the shank of the fastener. The method also includes the steps of inserting the fastener to be coated through a preformed slug of material, inserting the fastener and the material in a die, and subsequently forcing the fastener into the die to extrude the slug of material around the shank of the fastener. The material which is extruded around the shank of the fastener may be compatible with the work pieces with which the fastener is to be used to prevent corrosive reactions between the work pieces and the fastener when the fastener is installed.

A second embodiment of the method includes the step of molding a material around the shank of the fastener wherein the molded material has a uniform thickness both along the length of the shank of the fastener and circumferentially about the shank of the fastener. The method also includes the steps of inserting the fastener in a passage through a die and maintaining the fastener centered within the passage through the die, forcing the material to be molded around the shank of the fastener, and subsequently ejecting the fastener with the coating thereon from the die. The material molded onto the shank of the fastener may be compatible with the work pieces with which the fastener is to be used to prevent corrosive reactions between the work pieces and the fastener.

A first embodiment of the apparatus of the invention includes a die defining a passage therethrough with an enlarged portion and a reduced extruding portion, a punch insertable in the enlarged portion of the passage, an ejecting member insertable through the reduced extruding portion, and a bushing member carried within the die for maintaining the fastener centered as it is passed through the reduced extruding portion of the passage through the die. The enlarged portion of the passage has a diameter sufficient to receive the fastener head therein with the slug of material to be extruded around the fastener, whereas the reduced extruding portion of the passage has a diameter equal to the diameter of the shank of the fastener plus two times the thickness of the material to be extruded around the shank of the fastener. The punch is of a size and configuration effective to be inserted into the enlarged portion of the passage to force the shank of the fastener through the reduced extruding portion of the passage and extrude the slug of material carried around the fastener about the shank of the fastener. The ejecting member is effective to pass through the extruding portion of the passage while contacting the fastener with the material extruded on the shank thereof and eject the fastener from the die.

A second embodiment of the apparatus of the invention includes a two piece die, one piece of the die defining a passage therethrough having a configuration complementary to the configuration of the shank and head of a fastener onto which a material is to be molded, and the other piece of the die defines a threaded passage therethrough alignable with the passage through the first piece of the die and into which the fastener is threaded for positioning within the passage through the first piece of the die. The passage through the first piece of the die has a diameter equal to the diameter of that portion of the fastener positioned therein plus twice the thickness of the material to be molded onto the fastener. A second passage is defined between the two pieces of the die and communicates with the passage through the first piece of the die so that the material to be molded around the fastener can be introduced therethrough to mold the material around the fastener. The two pieces of the die are positioned together so that the passages therethrough are aligned, the fastener is screwed into the passage through the second piece of the die, and then the material to be molded onto the fastener is introduced through the passage between the two pieces of the die and into the passage of the first piece of the die to mold the material about the fastener. The second piece of the die is screwed from the fastener and the fastener is knocked out of the die, thereby shearing of the material lying in the passage between the two pieces of the die and producing a finished fastener.

These and other features and advantages of the invention will become more clearly understood upon consideration of the following description and accompanying drawings wherein like characters of reference designate corresponding parts throughout and in which:

These figures and the following detailed description disclose specific embodiments of the invention; however, the inventive concept is not limited thereto since it may be embodied in other forms.

DESCRIPTION OF ILLUSTRATIVE EMBODIMENTS

Figure 1:
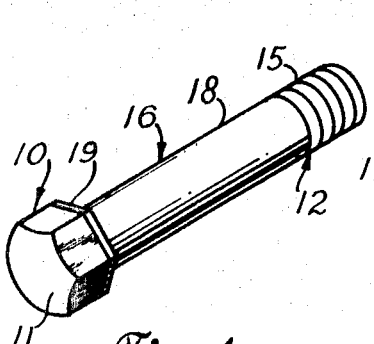
FIG. 1 is a perspective view of a fastener in accordance with the invention disclosed herein.
Figure 2:
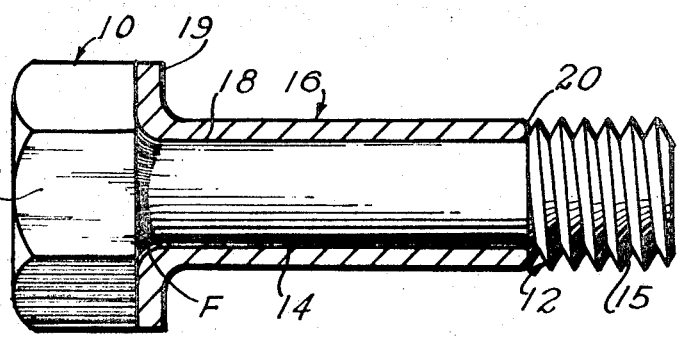
FIG. 2 is a cross-sectional view of the fastener shown in FIG. 1.

Referring specifically to FIGS. 1 and 2, the invention disclosed herein includes a fastener which has a coating between the bearing surfaces of the fastener and the work pieces which the fastener will attach together. The fastener is designated generally with the reference 10, and has a head 11 and a shank 12 with an unthreaded portion 14 and a threaded portion 15. The unthreaded portion 14 of the shank 12 and the underside of the head 11 has a coating 16 therearound. The coating 16 is shown in FIG. 2 as having a cylindrical wall 18 which lies adjacent the unthreaded portion of the shank 12 and an outwardly turned end wall 19 which fits the underside of the head 12.

It will be noted in FIG. 2 that the unthreaded portion 14 of the shank 12 has a diameter which is less than the diameter of the threaded portion 15 of the shank 12 and that the coating 16 increases the effective diameter of the unthreaded portion 14 of the shank 12 to that of the threaded portion 15 of the shank 12. The finished fastener 10, then, shown in FIG. 2, is now of standard size. In like manner, the coating 16 may be used to increase the effective diameter of a standard size unthreaded portion 14 of the shank 12 to make an oversize fastener out of the fastener 10.

Figure 3:
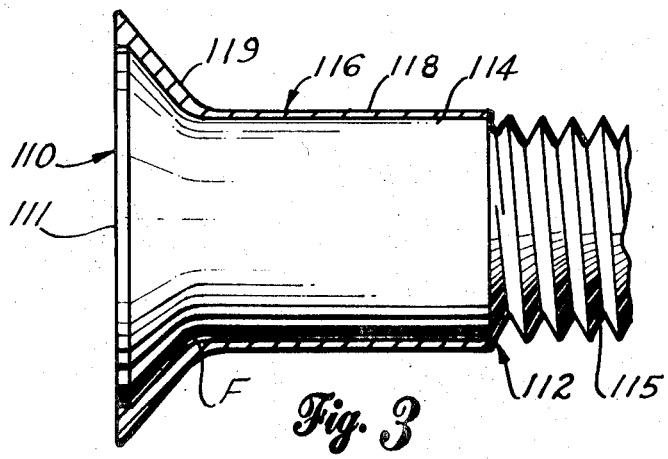
FIG. 3 is a cross-sectional view of a different type fastener manufactured in accordance with the invention disclosed herein.

FIG. 3 illustrates a fastener 110 having a head 111 and a shank 112. The fastener 110 is of the countersunk type, whereas the fastener 10 is of the exposed head type. The shank 112 of the fastener 110 includes an unthreaded portion 114 and a threaded portion 115 corresponding to the appropriate portions of the shank 12 of the fastener 10. The fastener 110 has both the unthreaded portion 114 and the threaded portion 115 of the shank 112 of a standard size and a coating 116 is provided around the fastener 110 to increase the effective diameter of the shank 112.

The coating 116 includes a cylindrical side wall 118 and a flared wall 119 which is integral with the side wall 118 and extends out under the head 111 of the fastener 110. The side wall 118 of the coating 116 may be of one thickness while the flared wall 119 may be of a different thickness.

The coating 116 illustrated has a side wall thickness of approximately .008 inch to enlarge the effective diameter of the shank 112 1/64 inch; however, various thicknesses of material may be extruded onto the shank 112. The flared wall 119 is shown substantially thicker than the side wall 118; however, it is to be understood that the thickness of the flared wall 119 may be selectively varied as desired. The thickness of the flared wall 119 will, however, depend somewhat on the extruding operation as will be disclosed hereinafter.

Figure 4:
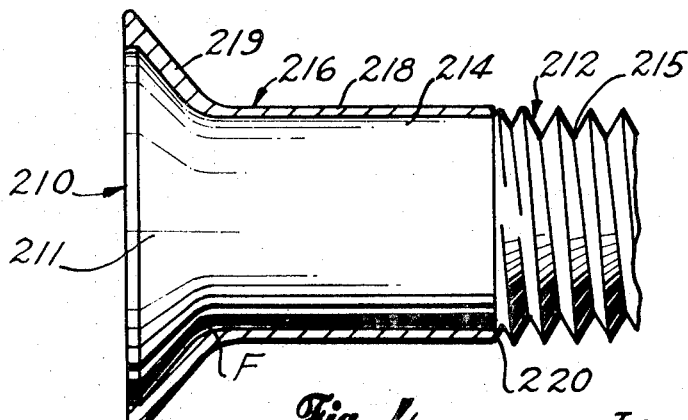
FIG. 4 is a cross-sectional view of a modified fastener from that shown in FIG. 3.

A fastener 210 is shown in FIG. 4 having a head 211 and a shank 212. The fastener 210 is also of the countersunk head type but has the threaded portion 215 of the shank 212 of standard diameter while the unthreaded portion 214 of the shank 212 has a slightly reduced diameter as does the fastener 10. A coating 216 is provided around the fastener 210 and includes a side wall 218 and a flared end wall 219, the side wall 218 encircling the unthreaded shank portion 214 of the fastener 210 and the flared wall 219 encircling the underside of the head 211 of the fastener 210.

It will be noted that a shoulder 20 as shown in FIG. 2, or a shoulder 220 as shown in FIG. 4 is formed at the junction of the reduced diameter unthreaded portion of the fastener shank and serves as a stop for the coating 16 or 216 extruded or molded onto the unthreaded portion of the shank of the fastener. Moreover, it will also be noted that the fillet F defined between the head and shank of the fasteners shown in FIGS. 2, 3 and 4 is of a greater diameter than that normally associated with a conventional fastener. This serves to increase the fatigue life of the fastener, and since the extrusion operation work hardens this fillet F, the fatigue strength of the fastener is further increased in this area.

Figure 5:
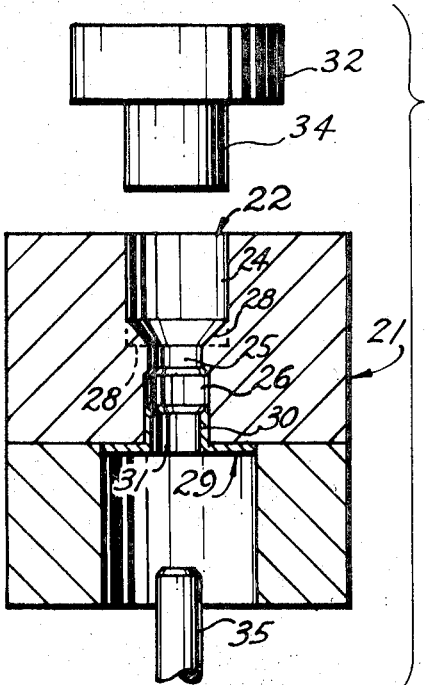
FIG. 5 is a cross-sectional schematic view of a first embodiment of the apparatus of the invention.

Referring to FIG. 5, the apparatus of the first embodiment of the method of the invention includes a die 21 defining a passage 22 therethrough. The passage 22 has an enlarged portion 24, an extruding portion 25, and an intermediate portion 26. The extruding portion 25 is located between and communicates with the enlarged portion 24 and the intermediate portion 26. The effective diameter of the portion 25 is equal to the outside diameter of the coating 16, 116, or 216 to be applied to a fastener. Since the coating is to be applied directly to the shank of the fastener, the fastener itself serves as a core for the extruding operation. It is to be understood that the shoulder 28 connecting the enlarged portion 24 with the extruding portion 25 must be altered to conform to the head configuration of the fastener which is to be used in the die. The shoulder 28 shown in FIG. 5 in solid lines is used with countersunk head fasteners while a configuration as shown in dashed lines can be used with exposed head fasteners.

A bushing 29 which is washer shaped and includes a cylindrical upstanding portion 30 is provided for centering the fastener during the extrusion operation to insure that the coating applied to the fastener will be concentric with the unthreaded portion of the fastener itself. The bushing 29 defines a passage 31 therethrough and the outside diameter of the upstanding cylindrical portion 30 is effective to fit within the intermediate portion 26 of the passage 22. Therefore, it will be seen that as the fastener is pushed through the extruding portion 25 and down into the intermediate portion 26, the fastener will slidably pass through the passage 31 in the bushing 29 and thus center the fastener during the extruding operation.

A punch 32 having a cylindrical projection 34 extending therefrom which slidably fits within the enlarged portion 24 of the passage 22 is provided for driving the fastener within the enlarged portion 24 partially through the extruding portion 25 to extrude the coating onto the fastener. The punch 32 is operated in such manner that the projection 34 drives the fastener through the extruding portion 25 just sufficiently to form the coating on the fastener.

An ejecting pin 35 is provided which is slidably extendable through the passage 31 through the bushing 29 to eject the fastener with the coating thereon from the die 21. When the fastener is thus ejected, it is finished and ready for installation.

Figure 6:
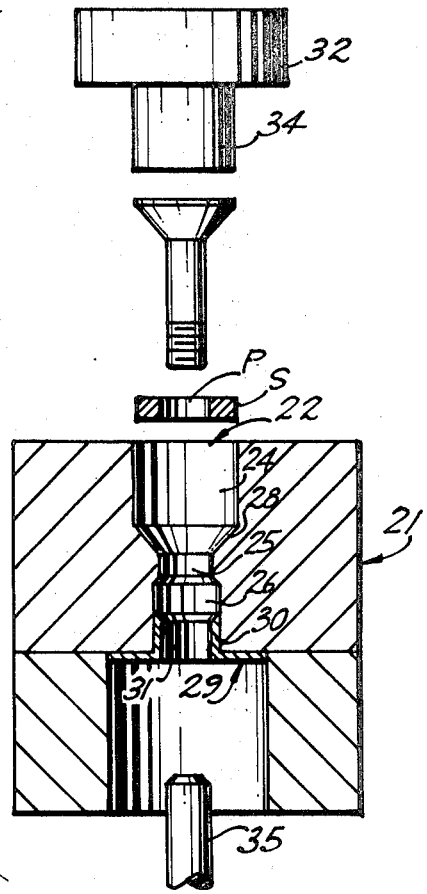
FIG. 6 is an exploded view showing the fastener to be coated being inserted in the die shown in FIG. 5.
Figure 7:
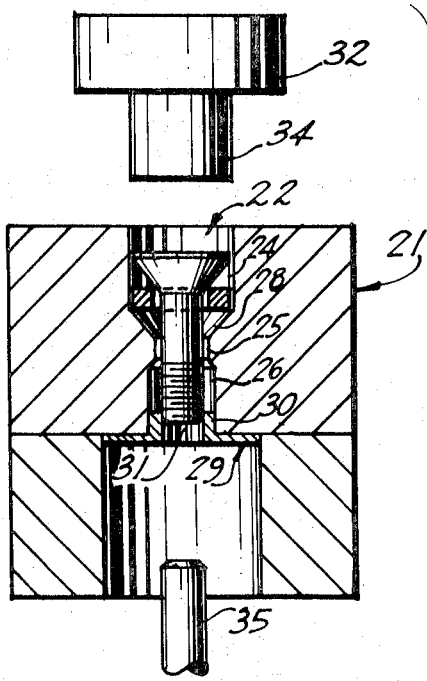
FIG. 7 is a view showing the die of FIGS. 5 and 6 after the fastener and material have been inserted in the die and the extrusion process is ready to be performed.
Figure 8:
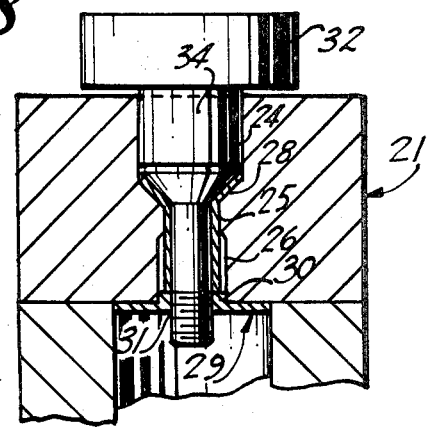
FIG. 8 is a view of the apparatus shown in FIGS. 5, 6 and 7 after the material has been extruded onto the fastener.

Referring more specifically to FIG. 6, a fastener is shown ready for insertion into the passage 22 in the die 21 and through a washer shaped slug S of material to be extruded around the fastener. The slug S has a predetermined volume so that the extrusion of the coating onto the fastener can be accurately controlled.

The fastener is then inserted into the passage P through the slug S until the slug S rests against the head of the fastener and the combination thereof is dropped into the enlarged portion 24 of the passage 22. In this position, the shank of the fastener extends through the extruding portion 25 of the passage 22 and into the intermediate portion 26. The threaded portion of the shank of the fastener extends into the passage 31 of the bushing 29 so that the fastener will be maintained centered within the extruding portion 25. It will also be noted that the head of the fastener checks the upward movement of the slug S and the passage P therethrough maintains the fastener centered in conjunction with the bushing 29.

The punch 32 is then lowered and the projection 34 engages the head of the fastener and forces the fastener down through the extruding portion 25 a predetermined amount. This causes the slug S to be deformed and extruded around the unthreaded portion of the shank of the fastener and under the head thereof as disclosed hereinabove. Therefore, by controlling the depth to which the projection 34 forces the fastener through the extruding portion 25 and by controlling the volume of material in the slug S, the size of the coating extruded onto the fastener can be accurately controlled.

The coating extruded onto the fastener is stopped at the junction of the threaded portion of the shank and the unthreaded portion of the shank by the bushing 29 if the coating enlarges the effective diameter of the unthreaded portion of the shank of the fastener to make an oversize fastener, or is stopped by the shoulder 20 formed at the junction of the threaded portion of the shank and the unthreaded portion of the shank as previously disclosed herein. The amount of material of the slug S remaining under the head of the fastener can be used to compensate for slight inaccuracies in the volume in the slug S. This insures that the coating extruded on the unthreaded portion of the shank of the fastener adequately covers the entire unthreaded portion of the shank without having any excess spill over into the threaded portion of the shank of the fastener.

The punch 32 is then raised and the ejection pin 35 is moved up to and engages the end of the fastener extending through the passage 31 and ejects the fastener with the coating thereon from the die 21 so that the fastener is now ready for use.

Figure 9:
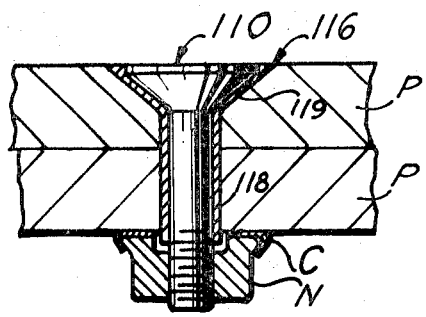
FIG. 9 is a cross-sectional view of a fastener manufactured according to the apparatus shown in FIGS. 5–8 after it has been installed in some work pieces.

FIG. 9 shows a fastener 110 made in the die 21 with a coating 116 in use. The nut N used with the fastener 110 has a recess extending therein into which the coating 16 can extend to allow the fastener to be used with different sizes of work pieces P. The nut N is provided with a coating or a washer C on that side contacting the work pieces P so that corrosion between the fastener and the work pieces P can be inhibited.

While numerous metals can be utilized to form the coating on the fastener, it is envisioned that aluminum will easily lend itself to such a coating and is sufficiently ductile to produce the thin coating necessary to protect the fastener from corrosion while not being so thick as to change the mechanical characteristics of the fastener. Recently, a new moldable plastic material has become available on the market under the trade name of "Dynamold" and manufactured by Dynamold, Inc., P.O. Box 9617, Fort Worth, Tex. 76107. It is also envisioned that this material may be extruded onto the fastener to form the coating thereon without altering the mechanical characteristics of the fastener appreciably.

In order to facilitate the extrusion operation, the fastener may be electroplated with some material, such as cadmium, prior to the extrusion process and this plating used as a lubricant during the extrusion process to facilitate the same. Furthermore, the fastener itself can be lubricated with some commercially available lubricant prior to the extrusion process to facilitate the operation. The slug S may also have the lubricant formed therein to facilitate in extruding the coating around the fastener.

Figure 10:
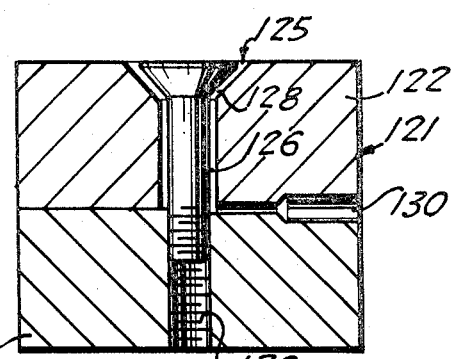
FIG. 10 is a cross-sectional view of the second embodiment of the apparatus of the invention showing a fastener mounted therein for material to be molded therearound.
Figure 11:
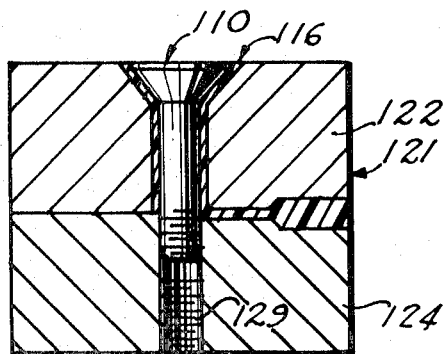
FIG. 11 is a view as shown in FIG. 10 after the material has been molded onto the fastener.
Figure 12:
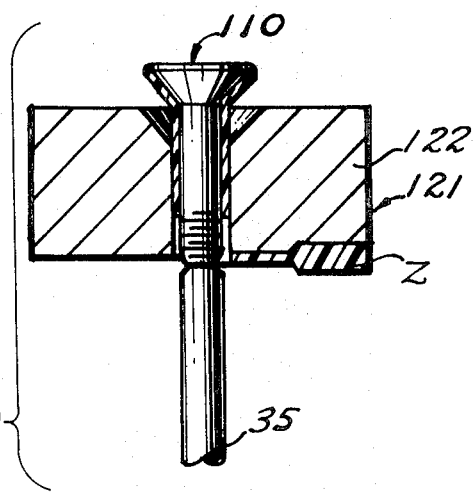
FIG. 12 is a view as shown in FIGS. 10 and 11 as the fastener is being ejected from the die and the sprue formed during the molding operation is sheared from the fastener.

Referring to FIGS. 10–12 it will be seen that the second embodiment of the apparatus of the method of the invention includes a mold 121 having an upper die 122 and a lower die 124. The upper die 122 defines a passage 125 therethrough. The passage 125 includes a shank molding portion 126 and a head molding portion 128. The shank molding portion 126 is effective to encircle the unthreaded portion of the shank of the fastener for molding a coating thereon. The head molding portion 128 fits adjacent the head of the fastener placed therein for forming the coating around the underside of the head of the fastener. The die 122 shown in FIGS. 10–12 is for a countersunk head fastener. However, it is to be understood that the die 122 may have the passage 125 therethrough easily modified for use with an exposed head fastener. The portion 126 connects with the portion 128 so that a continuous coating is formed on the unthreaded portion of the shank and the underside of the head of the fastener. The diameter of the portion 126 of the passage 125 has a diameter which is equal to the diameter of the unthreaded portion of the shank of the fastener plus twice the thickness of the coating to be applied to the shank and the portion 128 of the passage 125 has a configuration effective to surround the underside of the head of the fastener and be spaced therefrom to form the coating around the underside of the head.

The die 124 defines a threaded passage 129 therethrough alignable with the passage 125 through the die 122 when the dies 122 and 124 are placed together. The passage 129 is threaded to engage the threaded portion of the shank of the fastener and position the same therein. The passage 129 is so constructed that when a fastener is screwed therein it will position the fastener properly within the passage 125 so that the coating can be formed around the unthreaded portion of the shank and the underside of the head of the fastener. A passage 130 is defined between the dies 122 and 124 and communicates with the passage 125. The material to be molded around the fastener is injected through the passage 130 into the passage 125 with the fastener serving as a core for the molding process. The material is shown injected into the passage 125 in FIG. 11.

After the material forming the coating on the fastener has been injected around the fastener, the die 124 is unscrewed from the fastener and an ejecting pin 131 having a diameter effective to pass through the passage 125 engages the threaded portion of the fastener and drives the fastener with the coating thereon from the die. This operation is also effective to shear the sprue Z formed as an incident of the molding operation from the coating around the fastener.

Figure 13:
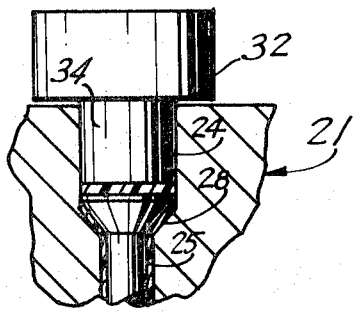
FIG. 13 is a partial enlargement of FIG. 8 showing the coating of the head of the fastener.

Many times a fastener must be driven into place by a conventional driving tool where an interference fit is involved between the fatsener and the work pieces. Unless the driving tool is perfectly aligned with the head of the fastener the tool generally scores the head of the fastener and breaks through the electroplated coating thereon to allow corrosion to take place between the environment in which the fastener is used and the head thereof. FIG. 13 shows a method of producing a fastener which has a thicker coating on the head thereof so that the driving operation will not adversely affect the head of the fastener after the fastener is inserted through the passage P in the slug of material S. As the punch 32 is lowered and the projection 34 engages the secondary slug of material D, it extrudes the slug of material S in the aforementioned manner and presses the secondary slug of material D against the top of the head of the fastener with sufficient force to cause the slug S to be flattened and pressure welded to the top of the head of the fastener. In this manner, the head of the fastener will thus be protected during the driving operation where an interference fit is involved.

THE METHOD OF THE INVENTION

The method of the invention comprises generally forming a material around the shank of the fastener to define a coating for the fastener having a substantially uniform predetermined thickness along the length of the shank and about the circumference of the shank. As an incident of forming the coating around the shank of the fastener, the material is also formed to define a coating in juxtaposition with the underside of the head of the fastener.

The first embodiment of the method of the invention includes generally extruding the material around the fastener to form the coating and the second embodiment of the invention includes generally molding the material around the shank and on the underside of the head of the fastener to form the coating therearound. More specifically, the method of manufacturing the fastener of the first embodiment of the method includes the steps of forming a fastener having a head and a shank with the shank having an unthreaded portion and a threaded portion, electroplating the fastener thus formed to deposit a predetermined amount of electroplated material such as cadmium thereon, inserting the fastener through a washer-shaped slug of material such as aluminum or an extrudable plastic material, which has a predetermined volume and defines a passage therethrough through which the fastener is inserted and into a passage through a die wherein the passage has a first portion with a diameter sufficient to receive the slug therein in an undeformed condition, forcing the shank of the fastener a predetermined amount into a second portion of the passage through the die which communicates with the first portion of the passage and has a diameter equal to the outside diameter of the coating to be formed on the fastener to cause the slug of material to be extruded around the unthreaded portion of the shank and enlarge the unthreaded portion of the shank of the fastener. The electroplated material acts as a dry lubricant between the slug of material and the fastener during the extruding of the slug of material. The fastener is maintained centered within the second passage during the extruding of the slug of material to insure a circumferential uniform thickness of the slug of material about the unthreaded portion of the shank.

It will also be noted that the extruding operation is stopped when the underside of the head of the fastener and the unthreaded portion of the shank have been covered by the material extruded therearound. The extrusion of the coating around the unthreaded portion of the shank may be positively stopped at the threaded portion of the shank to prevent the covering of any of the threads on the threaded portion of the shank. While it is disclosed that aluminum or an extrudable plastic material such as "Dynamold" may be used, it is understood that other metals or other extrudable plastic materials may be substituted therefor and the same results achieved.

A secondary slug of material may be positioned over the head of the fastener to be pressed thereon as an incident to the extrusion step in the first embodiment of the method of the invention. The force exerted on the secondary slug of material is sufficient to cause the slug to be welded or bonded to the head of the fastener. This insures that the head of the fastener will not be damaged as an incident of the installation of the fastener.

More specifically, the second embodiment of the method of the invention includes forming and electroplating a fastener as set forth in the first embodiment of the invention, positioning the fastener concentrically in a passage through a die which has a diameter and configuration of the coating to be formed on the unthreaded portion of the shank and the underside of the head of the fastener, and injecting a moldable material into the passage around the fastener to form the coating. The fastener is maintained centered within the passage through the die to insure circumferential uniformity in the coating molded therearound. The fastener is then ejected from the die with the molding formed therearound, thereby shearing the sprue from the coating about the fastener to form the finished fastener.

While an extrudable plastic material such as "Dynamold" may be used with the second embodiment of the method of the invention, it is understood that various moldable metals and other plastic materials may be used to accomplish the same end. It is of prime importance, however, that the material molded about the shank and underside of the head of the fastener be easily moldable, since the coating formed on the fastener is very thin.

While specific embodiments of the invention have been disclosed herein, it is to be understood that the full use of modifications, equivalents and substitutions may be had without departing from the scope of the invention as set forth by the appended claims.

We claim:

1. A fastener for use in an application wherein the fastener carries a bearing load including:
   (a) an enlarged head;
   (b) a shank extending from said head, said shank having a threaded portion and an unthreaded smooth load carrying portion adjacent said head; and,
   (c) a metallic coating extruded onto and covering said unthreaded portion of said shank along its entire length and the underside of said head of said fastener while leaving said threaded portion of said shank exposed, said coating having a uniform predetermined thickness along the length of and circumferentially about said unthreaded portion of said shank, and having sufficient strength to maintain the load carrying characteristics substantially equal to the characteristics of the fastener before the coating is extruded thereon.

2. A fastener for use in an application wherein the fastener carries a bearing load including:
   (a) an enlarged head;
   (b) a shank extending from said head, said shank having a threaded portion and an unthreaded smooth load carrying portion; and,
   (c) a metallic coating extruded onto and covering said unthreaded portion of said shank and the underside of said head of said fastener while leaving said threaded portion of said shank exposed, said coating having a uniform predetermined thickness along the length of and circumferentially about said unthreaded portion of said shank, and having sufficient strength to maintain the load carrying characteristics substantially equal to the characteristics of the fastener before the coating is extruded thereon,
   wherein said threaded portion of said shank has a standard diameter and said unthreaded portion has a diameter a predetermined amount less than said threaded portion, and further including a fillet having a larger radius than that normally associated with a comparable standard fastener joining said unthreaded portion of said shank with said head, and wherein said coating has thickness to increase the effective diameter of said unthreaded portion of said shank to the standard diameter of said threaded portion of said shank.

3. The fastener as set forth in claim 2 wherein said head defines an exterior driving surface and further including a second coating secured to and covering said exterior driving surface of said head.

4. A method of protectively coating a fastener having a head and a shank with the shank having a smooth load carrying portion and a threaded portion comprising the steps of:
   (a) inserting the shank of said fastener through a central opening in a washer shaped slug of metallic material wherein said opening is of less diameter than the head of said fastener; and,
   (b) extruding said slug of metallic material around the smooth load carrying portion of said shank along the entire length thereof and on the underside of said head, but not passing over said head, while preventing the extrusion of said material around the threaded portion of said shank to form a coating about said load carrying portion of said shank having a substantially uniform predetermined thickness along the length thereof and sufficient strength to maintain the load carrying characteristics of said fastener substantially equal to the characteristics of the fastener before the coating is extruded thereon.

5. The method of claim 4 wherein the thickness of said extruded coating is substantially .008 inch.

6. The method of claim 4 wherein the step of extruding the metallic material includes extruding a thin coating of said material onto the underside of said head of said fastener.

7. A method of coating a fastener for use in an application wherein the coated fastener carries a bearing load, said fastener having a head and a shank with the shank having an unthreaded load carrying portion and a threaded portion, said method comprising the steps of:
   (a) inserting the shank of said fastener through a passage having a diameter just sufficient to receive said shank of said fastener therethrough defined through a washer-shaped slug of extrudable metal having an outside diameter equal to the maximum diameter of the head of said fastener and a predetermined volume;
   (b) inserting the washer shaped slug of metal and said fastener in an extruding passage in a die, said extruding passage having a first smooth portion with a diameter just sufficient to receive the head of said fastener and said slug of metal, when undeformed, therein, said extruding passage having a second smooth portion with a diameter equal to the outside diameter of the coating when extruded onto said shank;

(c) forcing said fastener toward said second portion of said extruding passage to force said shank in said second portion a predetermined distance while maintaining said shank centered in said second portion to cause said head of said fastener together with said die to extrude said slug of metal around said unthreaded shank portion and under said head in a thin uniform coating of sufficient strength to carry the bearing load to which the coated fastener will be supporting during its use after installation; and, (d) positively preventing the extrusion of said metallic material onto said threaded portion of said shank during the forcing of said shank into said second portion of said passage.

8. The method of claim 7 wherein said second portion of said extruding passage is 1/16 inch larger in diameter than said load carrying portion of said shank of said fastener.

9. The method of claim 7 wherein said slug of metal is an aluminum alloy.

10. The method of claim 7 wherein said fastener has a countersunk head and said extruding passage has a third portion joining said first and second portions thereof conforming to the configuration of the underside of said head.

11. The method of claim 7 wherein said fastener is forced toward said second portion of said extruding passage by a member inserted in said first portion of said extruding passage over said head of said fastener and having a configuration conforming to that of said first portion of said passage, said movement of said member being selectively controlled to force said shank of said fastener into said second portion of said passage a predetermined amount.

12. The method of claim 11 further including the step of positioning a secondary slug of extrudable metal over the head of the fastener in said first portion of said passage and under said member inserted in said first portion to cause said secondary slug of metal to be pressed onto the head of said fastener as an incident to the step of forcing said shank into said second portion of said passage.

13. A method of manufacturing a fatigue resistant standard size fastener for use in a load carrying application comprising the steps of:

(a) forming a fastener having a head and a shank with the shank having a standard diameter threaded portion and a smooth unthreaded load carrying portion with a diameter a predetermined amount less than the diameter of said threaded portion to form a shoulder between said threaded portion and said load carrying portion, said unthreaded portion joined to said head with a fillet radius greater than that associated with a comparable standard fastener;

(b) inserting the shank of said fastener through a passage having a diameter just sufficient to receive said shank of said fastener therethrough defined through a slug of extrudable metal having an outside diameter equal to the maximum diameter of the head of said fastener and a predetermined volume;

(c) inserting the slug of metal and said fastener into an extruding passage in a die, said extruding passage having a first smooth portion with a diameter just sufficient to receive the head of said fastener and said slug of metal, when undeformed, therein, said extruding passage having a second smooth portion with a diameter equal to the standard outside diameter of the threaded portion of said shank; and, (d) forcing said fastener toward said second portion of said extruding passage to force said shank into said second portion a predetermined distance to cause said head of said fastener together with said die to extrude said slug of metal around said unthreaded shank portion until said metal abuts said shoulder between said threaded and load carrying portions of said shank and under said head in a thin uniform coating of sufficient strength to carry the bearing load to which the coated standard fastener will be supporting during its use after installation.

14. The method of claim 13 wherein said slug of metal is an aluminum alloy.

15. Apparatus for extruding a coating around the unthreaded portion of the shank and the underside of the head of a fastener from a slug of metal wherein the shank also has a threaded portion comprising:

a die having a passage therethrough, said passage having a first smooth portion and a second smooth portion in communication with said first portion, said first portion having a diameter sufficient to receive the head and undeformed slug of metal therein, and said second portion having a diameter equal to the outside diameter of the coating to be applied to the unthreaded portion of the shank of the fastener; and, means for forcing the shank of the fastener from said first portion of said passage partly through said second portion of said passage to deform the slug of metal about the unthreaded portion of the shank to form a coating thereon, and means for positively preventing the extrusion of said metal onto said threaded portion of said shank.

16. Apparatus as set forth in claim 15 further including alignment means for centering said fastener in said passage while the fastener is forced therethrough.

References Cited

UNITED STATES PATENTS

| | | | |
|---|---|---|---|
| 1,717,388 | 6/1929 | Keeler | 10—10 |
| 2,191,171 | 2/1940 | Lee et al. | 174—166 |
| 2,326,455 | 8/1943 | Gray | 85—37 |
| 2,724,303 | 11/1955 | Holcomb | 85—10.1 |
| 2,934,480 | 4/1960 | Slomin | 85—1 C X |
| 3,202,749 | 8/1965 | White | 264—328 X |
| 3,389,749 | 6/1968 | Towns et al. | 264—328 X |
| 3,153,482 | 10/1964 | Buntz et al. | 72—265 X |

FOREIGN PATENTS

| | | | |
|---|---|---|---|
| 889,887 | 2/1962 | Great Britain | 85—50 |

RAMON S. BRITTS, Primary Examiner

U.S. Cl. X.R.

72—258, 265; 264—328